United States Patent [19]
Bacher et al.

[11] Patent Number: 5,417,856
[45] Date of Patent: May 23, 1995

[54] FILTER APPARATUS FOR FLUIDS TO BE CLEANED

[76] Inventors: Helmut Bacher, Bruck/Hausleiten 17; Helmuth Schulz, Badstrasse 20, both of St. Florian A-4490; Georg Wendelin, Waldbothenweg 84, Linz A-4433, all of Austria

[21] Appl. No.: 122,432
[22] PCT Filed: Mar. 19, 1992
[86] PCT No.: PCT/AT92/00035
  § 371 Date: Sep. 23, 1993
  § 102(e) Date: Sep. 23, 1993
[87] PCT Pub. No.: WO92/16351
  PCT Pub. Date: Oct. 1, 1992

[30] Foreign Application Priority Data
Mar. 25, 1991 [AT] Austria ................................. 656/91

[51] Int. Cl.$^6$ ............................................. B01D 33/44
[52] U.S. Cl. ................................. 210/333.1; 210/108; 210/411; 210/393; 425/185; 425/199
[58] Field of Search ............... 210/333.1, 332, 333.01, 210/108, 391, 411, 393; 425/185, 199

[56] References Cited

U.S. PATENT DOCUMENTS

| | | | |
|---|---|---|---|
| 3,221,888 | 12/1965 | Muller | 210/333.1 |
| 3,380,591 | 4/1968 | Muller | 210/333.1 |
| 3,557,959 | 1/1971 | Muller | 210/333.1 |
| 4,486,304 | 12/1984 | Neuman et al. | 210/333.1 |
| 4,568,459 | 2/1986 | Anders et al. | 210/333.1 |
| 4,752,386 | 6/1988 | Schultz et al. | 210/333.1 |
| 4,755,290 | 7/1988 | Neumann et al. | 210/333.1 |
| 4,849,113 | 7/1989 | Hills | 210/741 |
| 4,973,406 | 11/1990 | Ponzielli | 210/333.1 |
| 5,004,414 | 4/1991 | Stude et al. | 210/333.1 |
| 5,090,887 | 2/1992 | Gneuss | 210/333.1 |
| 5,125,823 | 6/1992 | Kreyenborg | 425/185 |
| 5,141,631 | 8/1992 | Whitman | 210/333.1 |

*Primary Examiner*—Cynthia L. Nessler
*Attorney, Agent, or Firm*—Salter & Michaelson

[57] ABSTRACT

A filter apparatus for thermoplastic synthetic plastics material includes a screen carrier member having at least one screen nest, the screen carrier member being shiftable in a longitudinal direction in a housing. For backwashing the screen nest, the screen nest is in connection with a washing channel in a washing position of the screen carrier member In order to make the washing process quickly, effectively and uniformly over the surface of the screen and in order to avoid an additional loss of the mass in the main flow at the backwashing process, a storage space is provided in the screen carrier member which is filled in normal operation with cleaned melt. A piston in the storage space is shifted for moving the material provided in the storage space in the backwashing direction through the screen nest and into the washing channel.

9 Claims, 2 Drawing Sheets

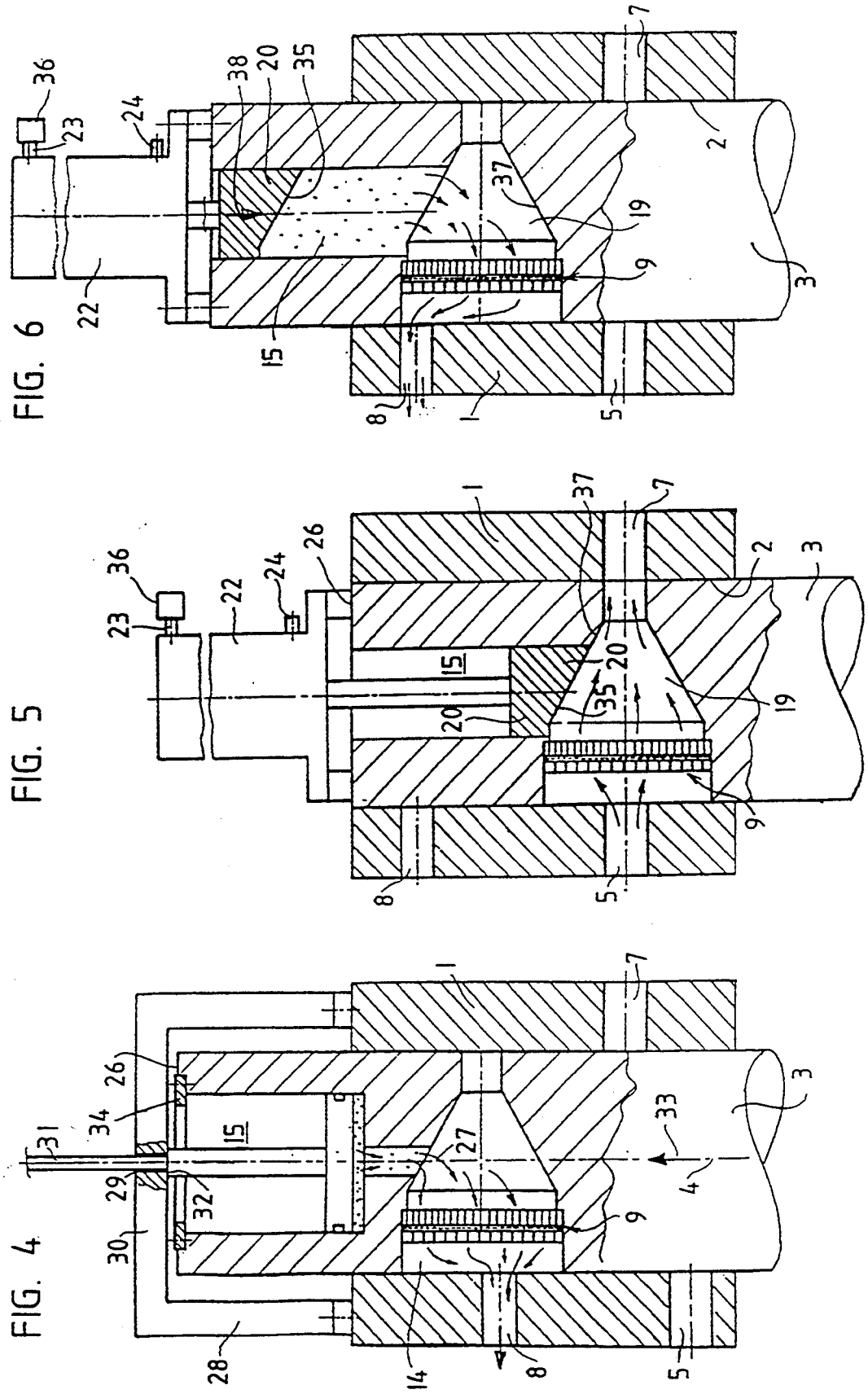

FILTER APPARATUS FOR FLUIDS TO BE CLEANED

BACKGROUND AND SUMMARY OF THE INVENTION

The invention relates to a filter apparatus for fluids to be cleaned, in particular for thermoplastic synthetic plastics material for extrusion purposes, comprising a housing having a guide for at least one screen carrier member carrying at least one screen nest and being reciprocable in the guide between an operating position, a washing position and a screen exchange position, wherein in the operating position fluid to be cleaned can be supplied to the upstream side of the screen nest via at least one supply channel and at least one discharge channel is provided on the downstream side of the screen nest for the discharge of the cleaned fluid after its passage through the screen nest, whereas in the washing position the supply channel is closed by the screen carrier member, and at least one washing channel is provided for the discharge of fluid streaming through the screen nest in a direction opposite to that of the operating position and of the impurities loosened thereby from the screen nest, and wherein only in the screen exchange position the screen carrier member protrudes so far from the guide that the screen nest is accessible for the screen exchange process.

Such filter apparatus are known (for example EP-B 250 895). Within these known apparatus two screen carrier members are disposed parallel to each other in order to avoid an interruption of the supply of the extruder or the like connected to the filter apparatus during washing the screen nests of the one screen carrier member. Within this, the cleaned melt used for washing purposes is taken from the downstream side of that screen carrier member that is just in the operating position. Within this, the washing effect (cleaning effect) depends substantially from the velocity of flow of the backwashing flow that on its parts depends from the backpressure of the tool (for example the extruder head) connected to the downstream side of the filter apparatus. This backpressure, as a rule, is relatively low and cannot be influenced at will. This results in a bad freewashing of the soiled screens or—in particular at bigger screen areas —in an only partial cleaning of the soiled screens. Further, there results a loss in the mass of the main flow at the backwashing moment, what loss is as greater as longer the duration is that is necessary for a sufficient washing of the screen nest or, respectively, of the screen nests of the sieve carrier member that is just in the washing position.

It has also already proposed to dispose a rotary disc valve between two stationary screen carrier members, which valve serves for switching over between normal operation and washing operation. During the washing operation cleaned fluid is pressed from the downstream side through the screen by means of a piston that enters an enlargement of the discharge channel. Since with this the discharge channel leading to the extruder remains open, the fluid can escape through this discharge channel so that only a comparatively low backpressure is at disposal for the backwashing process. The aforesaid disadvantages, therefore, can hardly be avoided also by this construction.

The invention has at its object to avoid these disadvantages, however to retain the initially described construction and to substantially improve the backwashing effect, but at same time to avoid the loss of the mass in the main flow at the backwashing moment and to avoid an access of invironmental air to the screen nests of all screen carrier members in the washing position as well as in the operating position. The invention solves this task by the features that a storage space or a channel leading to such a space branches off in the screen carrier member from the downstream side of the screen nest, which is formed by a filter layer supported between two perforated plates, which storage space takes up cleaned fluid for the washing process, at least one piston that enters into the storage space is provided for pressing the fluid during the washing process in backwashing direction through the screen nest, also the discharge channel being closed in the washing position of the screen carrier member by the screen carrier member. This storage space can take up the amount of cleaned fluid required for the washing process at any time, however preferably only immediately before the washing process in order to avoid a detrimental thermic influence upon the fluid, for example a cracking. In order to provide for this amount of fluid serving for washing purposes in the storage space, it is only necessary to retract the piston in the storage space and thereby to suck-in fluid into the storage space until it is sufficiently filled. This can be done as long as the filter to be cleaned is in the operating position, so that the storage space is filled with fluid that is supplied from the downstream side of the filter to be cleaned. Therefore, the amount of fluid required for the washing process must no more be taken from the flow of cleaned fluid of the screen carrier member disposed in parallel, so that at the backwashing moment no additional loss of mass occurs in the main flow. Also the loss of mass when filling the storage space is neglectibly low if the retraction of the piston in the storage space is made correspondingly slowly, what can be done without any problem. Overall, however, the fact that the fluid volume provided in the storage space can be pressurized at choice during the washing process by means of the piston due to the closure of the discharge channel by the previous shift of the screen carrier member into the washing position, enables one to select the velocity of flow of the backwashing flow by means of the backwashing piston velocity, or, respectively, by means of the forces acting on the piston, at choice and—what is of still greater importance—substantially higher than this was possible heretofore. In comparison to known constructions, this results in a substantially improved cleaning effect.

The invention is not limited to the provision of a second screen carrier member that remains in the operating position during the backwashing process and from the downstream side of which the fluid volume required for the backwashing process at the first screen carrier member is branched off. To the contrary, the invention is also applicable to filter apparatus having only one single screen carrier member, if at the backwashing process a short operation interruption of the apparatus connected to the filter apparatus, for example of the extruder, can be accepted. By the feature, that the washing process at the inventive apparatus can be carried out at a high pressure and, therefore, very quickly and effectively, the time during which the supply to the apparatus connected to the filter apparatus is interrupted, is very short, so that no real operation interruption may arise there. However, an embodiment is preferred in which two or more screen carrier members are disposed in parallel to each other—with respect to the fluid flow.

Of substantial advantage is further, that the construction of the reciprocable screen carrier member shown by the initially mentioned standard of art can be maintained. This has the advantage that the screen nests of all screen carrier members are always embraced from the casing in the washing position as well as in the operation position, and, therefore, are protected against access of environmental air. This is of importance when filtering fluids that are sensitive to air, for example several kinds of synthetic plastics material that are adversely affected by the access of air in a hot condition. Only for reaching the screen exchange position, the screen carrier member is shifted so far in its guide that the screen nest to be exchanged is accessible. The rest volume of fluid contained therein, however, cannot be used anyway and is carried off. The fresh inserted screen nest is still free of fluid and, therefore, it is not of importance if this screen nest is in contact with the air, as long as the screen carrier member is in the screen exchange position. If necessary, the exchanged screen nest can be evacuated before it is guided into the operation position. It would be also possible to guide this screen nest into the backwashing position before its introduction in the operating position, and to expel in this backwashing position the air in the screen by fluid supplied from the storage space.

According to a preferred embodiment of the invention, the storage space is disposed in the screen carrier member as a whole. This, on the one hand, facilitates machining of the storage space, because one single member only, namely the screen carrier member must be machined for producing the storage space. On the other hand, the construction is easier to clean and more simple in its entire structure. As a rule, in the screen carrier member there is sufficient room for accommodation of the storage space, only in particular cases a neighbouring housing member may form a section or the entire storage space, and then a channel leading to the storage space must be provided in the screen carrier member. To provide the storage space entirely in the screen carrier member facilitates it also to convert existing plants in the sense of the invention, because only the screen carrier member must be correspondingly exchanged or machined later on.

There are substantially two basic possibilities for actuating the piston in the storage space in order to expel the fluid volume provided in the storage space and required for cleaning purposes: On the one hand, according to a further embodiment of the invention, an own drive means may be provided for advancing the piston, that drive means being independent from the movement of the screen carrier piston. This enables a completely independent movement of screen carrier piston on the one hand and the piston disposed in the storage space on the other hand, however, as a rule, these two movements will be coordinated to each other, for example so that at first the screen carrier piston is brought into the position provided for the washing process and then the piston positioned in the storage space is advanced for carrying out the real washing process. Within this, it is recommended within the invention, if the drive means, in particular a double-acting pressure medium cylinder is fixed to the screen carrier piston, in particular at the front end thereof. The drive means for the piston positioned in the storage space then moves together with the screen carrier member.

Within the spirit of the invention, the other variant consists in that the piston provided in the storage space engages with a stop of its piston rod a counter stop, preferably a bridge, fixed to the housing, preferably in a detachable manner, and does not change its relative position with respect to the housing. Within this, the backwashing process is carried out only by shifting the screen carrier piston and an additional drive means for movement of the piston positioned in the storage space and fixed to the screen carrier piston can be saved. This results in a more simple and more economic construction.

As a rule, within the spirit of the invention the storage space is formed by an axial bore of the screen carrier channel, that bore extending up to the one front end of the screen carrier member. Within this, according to a preferred embodiment of the invention, the construction may be so chosen that the front surface of the piston facing the screen nest in the piston position nearest the screen nest is flush with the wall of the space disposed behind the screen nest in the screen carrier member, when seen in normal flowing direction of the fluid. The backwashing piston is then flush with respect to the main flow channel on the clean side of the screen nest (filter carrier). In operation of such an apparatus it is to be recommended to fill the backwashing reservoir only immediately before the real backwashing process. This avoids dead corners in which stillstanding hot fluid masses remain for a longer time. This is of importance in particular at synthetic plastics melts that tend to a thermic decomposition when being subject to a longer intense heating.

According to an advantageous further embodiment of the invention, the drive means for the piston positioned in the storage space comprises control means for influencing the movement of the this piston, for example a throttle check valve inserted into a supply line for the pressurized medium for the pressure cylinder serving for movement of the backwashing piston. This enables one to adjust at choice the quantity of the melt branched off from the main melt flow when filling the backwashing reservoir, without that for this a throttle means, for example a throttle nozzle, is necessary that is inserted into the backwashing channel and controls the backwashing flow. It is also of advantage that the control means used within the invention is disposed on the outside and therefore is always accessible for adjustment, service or exchange.

BRIEF DESCRIPTION OF THE DRAWINGS

In the drawing, exemplative embodiments of the subject according to the invention are schematically shown.

DETAILED DESCRIPTION OF THE PREFERRED EMBODIMENTS

Figure 2:
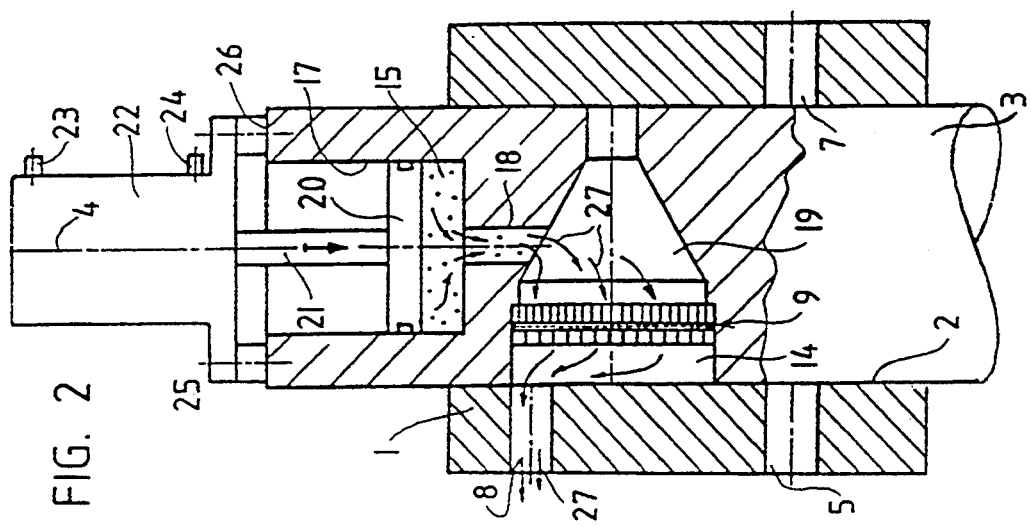
FIG. 2 shows a similar section, however in the backwashing position of the screen carrier member. The FIGS. 3 and 4 show similar sections of a second embodiment. The FIGS. 5 and 6 are also similar sections of a third embodiment.
Figure 1:
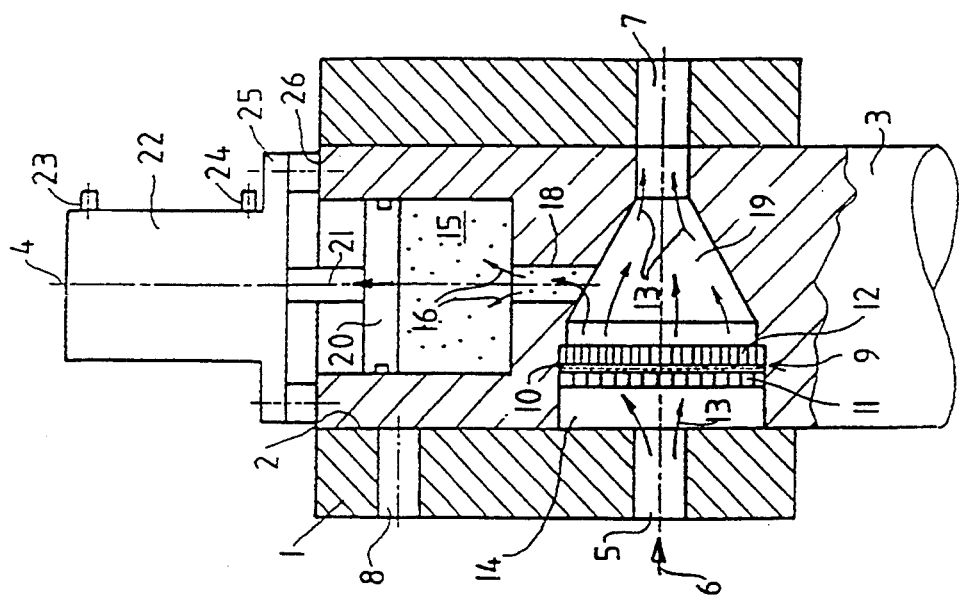
FIG. 1 shows a first embodiment in section and in the operation position.

In the embodiment according to FIGS. 1 and 2, a screen carrier member 3 formed by a cylindrical body is bearingly supported for being shifted in direction of its axis 4 in a guide means 2 formed by a bore in a stationary housing 1 of the filter apparatus. In the housing 1 there are provided a supply channel 5 for the synthetic plastics melt to be cleaned that is supplied in direction of the arrow 6, as well as a discharge channel 7 for the cleaned melt, and further a washing channel 8 used for backwashing purposes. In normal operation (FIG. 1) the synthetic plastics melt supplied via the channel 5 is cleaned by means of a screen nest 9 filtering the impurities, which nest comprises in a known manner at least one filter layer 10 that is supported between two apertured plates 11,12 of the screen nest 9. The flow of the melt flowing in normal operation through the screen nest 9 is shown by arrows 13.

In the backwashing position (FIG. 2), the room 14 in the screen carrier member 3 disposed in front of the screen nest 9—when seen in normal operation position—is in connection with the washing channel 8, what is obtained by a corresponding shift of the screen carrier member 3 in direction of its axis 4 for a sufficient distance. In the washing position or, respectively, during the entire duration of the washing process, the supply channel 5 and the discharge channel 7 are closed by the wall of the screen carrier member 3. Washing of the screen nest 9 in flow direction opposite to that of the normal operation position (FIG. 1) for washing purposes is effected by cleaned melt provided in a storage space 15, which melt has previously flown into the storage space 15 in direction of the arrows 16 (FIG. 1). The storage space 15 is formed by an axial bore 17 in the screen carrier member 3, which bore is in connection via a channel 18 with the room 19 in the carrier member 3 disposed in normal operation position behind the screen nest 9. In this cylindrically-shaped storage space 15 a piston 20 is sealingly guided, the piston rod 21 of which is connected to the piston rod of a double-acting pressure cylinder 22, preferably a hydraulic cylinder, the supply line or, respectively, discharge line for the pressurized medium of the cylinder being designated by 23,24. The cylinder 22 is fixed to the front end 26 of the screen carrier member 3 by means of a flange 25 and is shiftingly displaceable with the member 3 in direction of the axis 4.

If the screen nest 9 must be cleaned by backwashing, at first in the normal operation position (FIG. 1) the storage space 15 is filled with cleaned melt from the room 19 via the channel 18 by retraction of the piston 20. Suitably, this retraction of the piston 20 is made slowly in order to not substantially change the amount of melt supplied per time unit to the following extruder via the discharge channel 7. As soon as the storage space is filled with melt, the screen carrier member 3 is shifted in direction of the axis 4 into the backwashing position (FIG. 2) and thereby the supply channel 5 and the discharge channel 7 are closed. As soon as this position is reached, the cylinder 22 is so actuated that the piston 20 is advanced in the storage space 15. The amount of melt provided in the storage space 15 is therefore pressed through the channel 18 into the room 19 and through the screen nest 9 in direction opposite to the direction of normal operation (arrows 27, FIG. 2), and this melt cannot escape in another manner from the storage space 15. The impurities disposed in the screen nest 9 are therefore loosened from the screen nest 9 and are conveyed off through the washing channel 8 by the melt flow. This can be done very quickly and with a high pressure by corresponding actuation of the piston 20, so that the screen nest 9 is effectively and completely cleaned, completely independent from the conditions present in the discharge channel 7 and the members connected thereto (extruder head or the like) and also independent from the operation of a further screen nest that optionally is connected in parallel to the discharge channel. As soon as the backwashing process is terminated, the screen carrier member 3 is guided again into the position of normal operation (FIG. 1), the piston 20 remaining in its advanced position that suitably is so chosen that the piston 20 in this position engages the front end of the bore 17 that neighbours the screen nest 9. This avoids superfluous amounts of melt remaining in the storage space 15 that may crack by a long-time heating.

Figure 3:
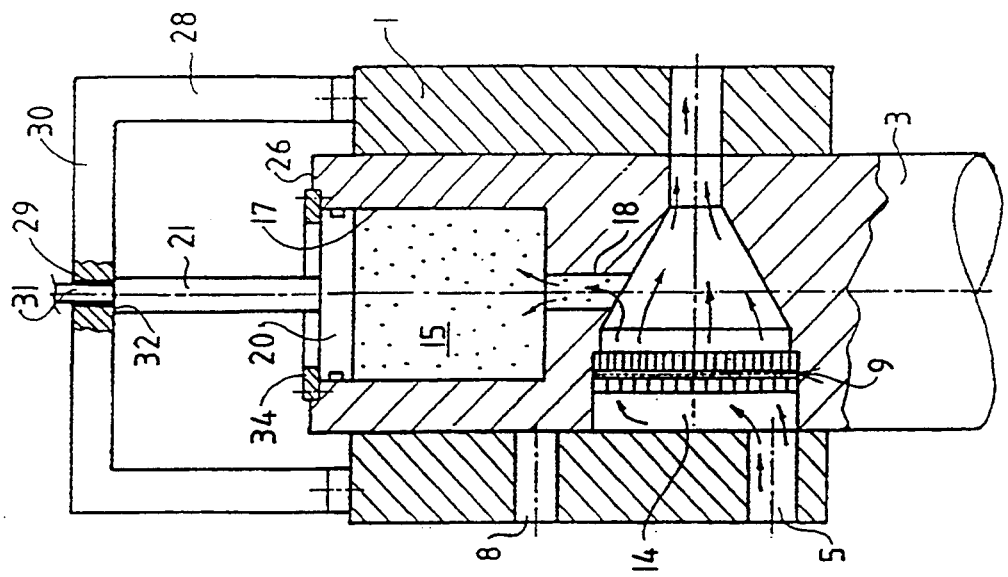

The embodiment according to FIGS. 3 and 4 differs from that according to FIGS. 1 and 2 substantially in that no separate drive means (pressure medium cylinder 22) is provided for the relative shift of the piston 20 with respect to the screen carrier member 3. Instead of this, a bridge 28 is detachably connected to the housing 1 which has an opening 29 in the transverse member 30 through which protrudes an elongation 31 of the piston rod 21 that has a reduced diameter, so that the piston 20 is supported centered with respect to the bore 17 confining the storage space 15. The transition between the elongation 31 and the piston rod 21 constitutes a stop 32 that always engages a counter stop formed by the transverse member 30 of the bridge 28. Optionally, the stop 32 may be fixed to this transverse member 30. In the position of normal operation shown in FIG. 3, the screen carrier member 3 is in a position that is most spaced apart from the transverse member 30 of the bridge 28. As FIG. 3 shows, the construction can be so chosen, that in this position the supply channel 5 does not centrally merge into the room 14 in front of the screen nest 9, but at the edge thereof. Then, the axes of the supply channel and the discharge channel 7 for the melt are not concentric. However, in the washing position (FIG. 4) the washing channel 8 is disposed almost centrally with respect to the room 14. At the change from the position of normal operation (FIG. 3) into the washing position (FIG. 4), the screen carrier member 3 is shifted in direction of its axis 4 in direction of the arrow 33 (FIG. 4). On this occasion, the supply channel 5 and the discharge channel 7 are closed and the front end 26 of the screen carrier member approaches to the transverse member 30 of the bridge 28. By this, the piston 20 positioned near the front end 26 in the position according to FIG. 3 is pressed into the storage space 15 and drives the melt present in the storage space in direction of the arrows 27 in washing direction through the screen nest 9 and into the washing channel 8 (FIG. 4). If the fluid to be cleaned is incompressible, as this is usually the case, the relative position of the supply channel 5, the washing channel 8 and the room 14 must be so chosen that the washing channel 8 comes into connection with the room 14 as soon as the supply channel 5 is closed, in order to avoid a breakage by building up excessive pressure at the washing process. A ring 34 connected to the front end 26 of the screen carrier member 3 avoids that the piston 20 can leave the storage space 15.

Within the embodiment according to FIGS. 5 and 6, also a cylinder 22 for pressurized medium is connected to the front end 28 of the screen carrier member 3. Now, the channel 18 (FIG. 1,2) can be omitted and the piston 20 positioned in the storage space 15 with its front surface 35 facing the room 19 is so formed that this front surface 35 merges stepless into the neighbouring wall 37 of the room 19 in the position of the piston 20 according to FIG. 5. By this, the main melt flow in normal operation (FIG. 5) is not at all disturbed and the storage space 15 can be formed as a straight drilled channel having a uniform diameter. Suitably, the wall 37 converges at the downstream side towards the discharge channel 7 in order to change from the comparatively large area of the screen nest 9 to a smaller diameter of the discharge channel 7.

The amount of the melt branched off from the main melt flow when filling the backwashing reservoir formed by the storage space 15, can be adjusted by a throttle valve 36 that suitably is formed by a throttle check valve. It allows a stepless adjustment of the branched-off backwashing flow for filling the storage space 15 and thereby an optimal adaptation to different restrictions of production and viscosities of the melt.

Also within the embodiment according to FIGS. 5 and 6, the piston 20 is retracted from the position shown in FIG. 5 before the screen carrier member 3 is shifted into the backwashing position (FIG. 6), so that the storage space 15 can be filled with melt required for the washing process. Only then the screen carrier member 3 is displaced into the position shown in FIG. 6 (backwashing position), whereafter the backwashing process starts by advancing the piston 20 in direction of the arrow 38 (FIG. 6). As soon as the piston 20 with its front surface is flush with the confining surface of the room 19, the screen carrier member 3 is guided back again into the position of normal operation shown in FIG. 5.

Within all embodiments, the screen nests can be easily dismounted if the screen carrier member 3 is advanced so far from the bore 2 guiding it that the screen nest protrudes from the housing 1 and therefore is easily accessible for the screen exchange process. As it can be seen, the displacement of the screen carrier member 3 into the screen exchange position within the embodiments according to FIGS. 1 and 2 or, respectively, 5 and 8 could be made upwardly as well as downwardly. Only within the embodiment according to FIGS. 3 and 4, the bridge 28 must at first be loosened from the housing 1 in order to allow a correspondingly large shift of the screen carrier member 3 to above. To below, a shift into the screen exchange position would be possible without any problem. As it can be seen, within all embodiments the screen nest 9 as well as the channels cooperating with it are completely enclosed by the housing 1 in all positions of operation except the screen exchange position, so that there no air can enter. The melt flowing in the apparatus, therefore, is protected against access of air.

As it can be seen, the invention is also applicable to such filter apparatus in which two or optionally even more screen nests 9 are provided in a screen carrier member 3. In the same manner, the invention is also applicable to constructions in which two or more screen carrier members 3 are shiftably guided in a common housing 1, the rooms 19 of which deliver to a common discharge channel 7 leading to the following plant. This plant may be an extruder for thermoplastic synthetic plastics material, however also a plant of another kind which requires cleaned fluid, however, the invention is mainly suitable for cleaning thermoplastic synthetic plastics material melts.

We claim:

1. Filter apparatus comprising:
    a stationary housing having a supply channel for fluid to be filtered, a discharge channel for filtered fluid, and a washing channel; and
    a screen carrier member guided for reciprocal movement in said housing and having a screen nest positioned therein, said screen nest comprising two perforated plates having a filter layer therebetween, said screen nest having an upstream side that receives fluid to be filtered and a downstream side that discharges filtered fluid, said carrier member further including a storage space which is connected with a space at the downstream side of said screen nest, said storage space having a piston reciprocally movable therein and means for moving said piston in said storage space for pressing said filtered fluid in said storage space in a backwashing direction through said screen nest,
    means for reciprocally displacing said screen carrier member in said housing between
    an operating position wherein a space at said upstream side of said screen nest is connected with said supply channel for receiving fluid to be filtered, and said space at said downstream side of said screen nest is connected with said discharge channel for discharging filtered fluid which has passed through said screen nest and with said storage space for introducing filtered fluid therein, said washing channel being closed by said carrier member when said screen carrier member is in said operating position,
    a washing position wherein said space at said upstream side of said screen nest is connected with said washing channel, said filtered fluid in said storage space being pressed in a backwashing direction through said screen nest and being discharged through said washing channel, said supply channel and said discharge channel being closed by said screen carrier member when said screen carrier member is in said washing position, and
    a screen exchange position wherein said screen carrier member protrudes from said housing such that said screen nest is accessible for a screen changing process.

2. In the filter apparatus of claim 1, said storage space being entirely disposed in said screen carrier member.

3. The filter apparatus of claim 1 further including a bridge that is detachably connected to said housing and assumes a stationary relative position with said housing, said piston having a piston rod with a reduced diameter end portion that extends through an aperture in said bridge and an increased diameter shoulder portion which engages said bridge as a counter stop.

4. In the filter apparatus of claim 1, said storage space comprising an axial bore that extends into said screen carrier member from a front end thereof.

5. In the filter apparatus of claim 1, said piston having a front end surface, said piston being normally disposed in said storage space so that said front end surface is flush with a wall of said space at said downstream side of said screen nest.

6. In the filter apparatus of claim 5, said wall of said downstream space converging towards a downstream end.

7. The filter apparatus of claim 1 further including drive means for movement of said piston, said drive means being independent from a drive for said screen carrier member.

8. In the filter apparatus of claim 7, said drive means comprising a double-acting pressurized medium cylinder, said cylinder being connected to a front end of said screen carrier member.

9. The filter apparatus of claim 8 further including a throttle check valve which is inserted into a pressurized medium supply line of said pressurized medium cylinder.

* * * * *